United States Patent [19]

Hirata et al.

[11] Patent Number: 4,821,865

[45] Date of Patent: Apr. 18, 1989

[54] WORK DELIVERING APPARATUS

[75] Inventors: Hisao Hirata, Hiratsuka; Shojiro Yokomizo, Yokohama; Hirokazu Mitsuhori, Kanagawa; Tadao Murano, Zama, all of Japan

[73] Assignee: Topy Kogyo Kabushiki Kaisha, Tokyo, Japan

[21] Appl. No.: 48,941

[22] Filed: May 12, 1987

[51] Int. Cl.⁴ .............................................. B65G 47/46
[52] U.S. Cl. ................................. 198/368; 198/369; 198/371; 198/372; 198/463.3
[58] Field of Search ............... 198/361, 368, 371, 372, 198/436, 437, 463.3, 369, 463.4

[56] References Cited

U.S. PATENT DOCUMENTS

| | | | |
|---|---|---|---|
| 2,062,604 | 12/1936 | Paxton | 198/369 |
| 2,156,248 | 4/1939 | Wegner | 198/463.3 |
| 2,732,057 | 1/1956 | Temple | 198/368 |
| 2,981,399 | 4/1961 | Parker | 198/369 |
| 3,564,898 | 2/1971 | Stettler . | |
| 3,733,069 | 5/1973 | Cady | 198/463.4 |
| 3,842,962 | 10/1974 | Grachev et al. | 198/367 |
| 4,228,671 | 10/1980 | Skeen . | |
| 4,410,078 | 10/1983 | Shields et al. | 198/358 |
| 4,541,520 | 9/1985 | Greenlee | 198/372 |

FOREIGN PATENT DOCUMENTS 2429281 7/1975 Fed. Rep. of Germany ...... 198/371

Primary Examiner—Joseph E. Valenza
Attorney, Agent, or Firm—Cushman, Darby & Cushman

[57] ABSTRACT

A delivering apparatus for selectively delivering a work conveyed from one inlet path to one of three paths. The delivering apparatus is disposed at an intersection of the inlet path and the exit paths. The delivering apparatus comprises a series of free rollers, a first stopper, and a series of chains. The series of free rollers can take upper and lower positions in a vertical direction between which an uppermost portion of the series of chains is positioned. When the series of free rollers takes the upper position and the first stopper is opened, the work is selectively conveyed out onto a first exit path which is located opposite to the inlet path. When the series of free rollers takes the lower position, however, the work is selectively conveyed out onto either a second exit path or a third exit path according to the rotational direction of the series of chains.

7 Claims, 4 Drawing Sheets

WORK DELIVERING APPARATUS

BACKGROUND OF THE INVENTION

1. Field of the Invention

The present invention relates to a work delivering apparatus and more specifically relates to a delivering apparatus for selectively delivering a work conveyed from one inlet path to one of a plurality of exit paths.

2. Description of the Prior Art

As shown in FIG. 4, on a production line of a disk wheel of a vehicle, a delivering station 7 is disposed for selectively delivering a work conveyed from one inlet path 4 to one of a plurality of exit paths 6 on which welding stations 5 are disposed. On the inlet path 4 is disposed an oil pressure-type inserting machine 3 which is provided at an intersection of a line 1 for conveying a wheel rim and a line 2 for conveying a disk which is pressure-inserted into the wheel rim by inserting machine 3. The combination of the wheel rim and the disk is selectively delivered at delivering station 7 to one of the exit paths 6 and is conveyed to the corresponding welding station 5 where the wheel rim and the disk are welded together. As shown, in the prior art there are two exit paths 6 per inlet path 4 for the purpose of increasing production efficiency, because welding at one welding station 5 requires more time than inserting a disk by one inserting machine 3. Accordingly, delivering station 7 must be able to deliver the rim-disk assembly to the free welding station 5.

However, there are the following problems in the delivering stations of the prior art. First, since delivering of work at delivering station 7 is performed manually, such manual delivering is dangerous to a worker. Second, such manual delivering decreases production efficiency, and third, since space for a worker has to be provided opposite to the inlet path at the delivering station, it is impossible to provide another exit path at a space opposite to the inlet path. In other words, it is impossible to provide three exit paths per one inlet path for the purpose of increasing production efficiency.

OBJECTS AND SUMMARY OF THE INVENTION

An object of the present invention is to provide a delivering apparatus which is capable of automatic delivering.

Another object of the present invention is to provide a delivering apparatus having three exit paths per inlet path.

The above objects are achieved, according to the present invention, by a delivering apparatus for selectively delivering a work conveyed from one inlet path to one of three exit paths, the exit paths comprising a first exit path which extends opposite to the inlet path from an intersection of the inlet path and the exit paths, a second exit path which extends rightward from the intersection and a third exit path which extends leftward from the intersection, the delivering apparatus being located at the intersection, and the delivering apparatus comprising:

a series of free rollers for flowing the work from the inlet path to the first exit path, the series of free rollers being selectively moved between an upper position and a lower position positioned lower than the upper position, each free roller composing the series of free rollers extending in a direction which is at a right angle with respect to the direction in which the inlet path and the first exit path extend;

a first stopper provided between the series of free rollers and the first exit path, the first stopper being selectively moved between an opening position and a closing position; and a series of chains for selectively conveying the work to one of the second and third exit paths, each chain composing the series of chains being disposed between adjacent free rollers of the series of free rollers and each chain being selectively driven in either a normal or a reverse direction, an uppermost portion of the series of chains being disposed between the upper position and the lower position between which the series of free rollers is moved.

In accordance with the above-mentioned apparatus, the work conveyed to the intersection from the inlet path is selectively delivered to one of three exit paths in the following manner.

When the work is required to be delivered to the first exit path, the series of free rollers is moved to the upper position, which is positioned higher than the uppermost portion of the series of chains, and the first stopper is moved to the opening position. The work introduced to the intersection continues to move forward on the series of free rollers by its inertia and by gravity to the first exit path without hitting the first stopper and is conveyed onto the first exit path.

When the work is required to be selectively delivered to one of the second and third exit paths, on the other hand, the first stopper is moved to the closing position. The work conveyed into the intersection will thus hit the first stopper and stop. Then, the series of free rollers is moved to the lower position, which is positioned lower than the uppermost portion of the series of chains, and the series of chains is driven in the direction in which the work is required to be conveyed. It is also possible to provide second and third stoppers between the intersection and the second and third exit paths, and one of the second and third stoppers corresponding to the exit paths into which the work is required to be conveyed out may be selectively opened. In this manner, the work is selectively conveyed out through either the second or third exit path.

In the above-mentioned manner, the work is selectively conveyed out into one of three exit paths. What exit path the work should be conveyed into is selectively controlled by a computer which electrically communicates with the delivering apparatus, which further communicates with a machine such as an inserting machine, disposed on the front side of the delivering apparatus, and a machine such as a welding machine, disposed on the rear side of the delivering apparatus.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which.

DETAILED DESCRIPTION OF THE PREFERRED EMBODIMENT

A preferred embodiment of the present invention will be explained below with reference to FIGS. 1 to 3.

Figure 1:
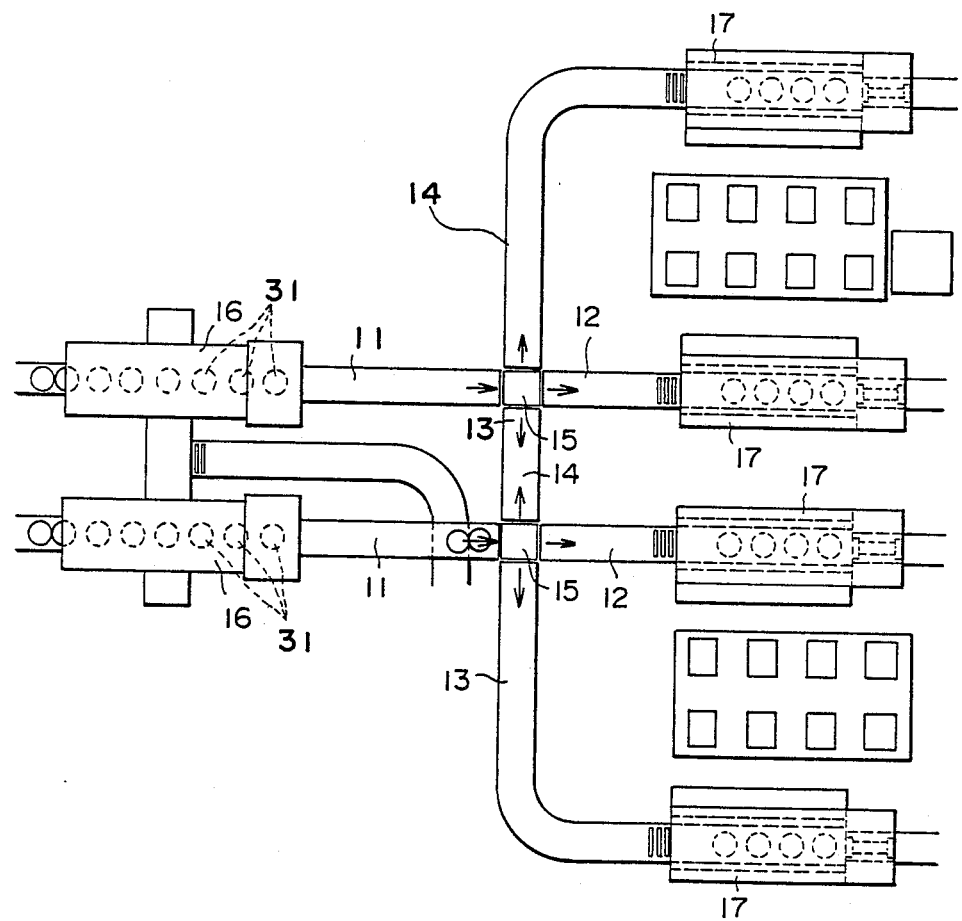
FIG. 1 is a schematic view illustrating a delivering apparatus disposed in a wheel production line according to an embodiment of the present invention.

FIG. 1 illustrates a conveyor line for conveying a work in accordance with the present invention. Each path of the conveyor line comprises a single inlet path 11 and three exit paths. Each inlet path 11 has a corresponding first exit path 12, second exit path 13, and third exit path 14. These four paths 11 to 14 intersect at an intersection 15. First exit path 12 extends opposite to inlet path 11 on an extension of inlet path 11 through intersection 15. Second exit path 13 extends rightward from intersection 15 in a direction which is at a right angle with respect to the direction in which inlet path 11 and first exit path 12 extend. Third exit path 14 extends leftward from intersection 15 in a different direction which is at a right angle with respect to the direction in which inlet path 11 and first exit path 12 extend.

The delivering device in accordance with the present invention is interposed at intersection 15. When the conveyor line is used for a production line of a disk wheel of a vehicle, for example, a work 31 comprises a combination of a wheel rim and a disk which is inserted into the wheel rim. In such a case, an inserting machine 16 for inserting a disk into a wheel rim is provided on inlet path 11, and a welding station 17 for welding the disk and the wheel rim together is provided on each exit path 12, 13 and 14. The delivering apparatus provided at intersection 15 selectively delivers the work conveyed from inlet path 11 into intersection 15 onto one of exit paths 12, 13 or 14. A plurality of such conveyor lines may be integrally disposed in parallel with each other such that second exit path 13 of one conveyor line and third exit path 14 of the other conveyor line are used in common. FIG. 1 illustrates an embodiment where two such conveyor lines are integrally disposed.

Figure 2:
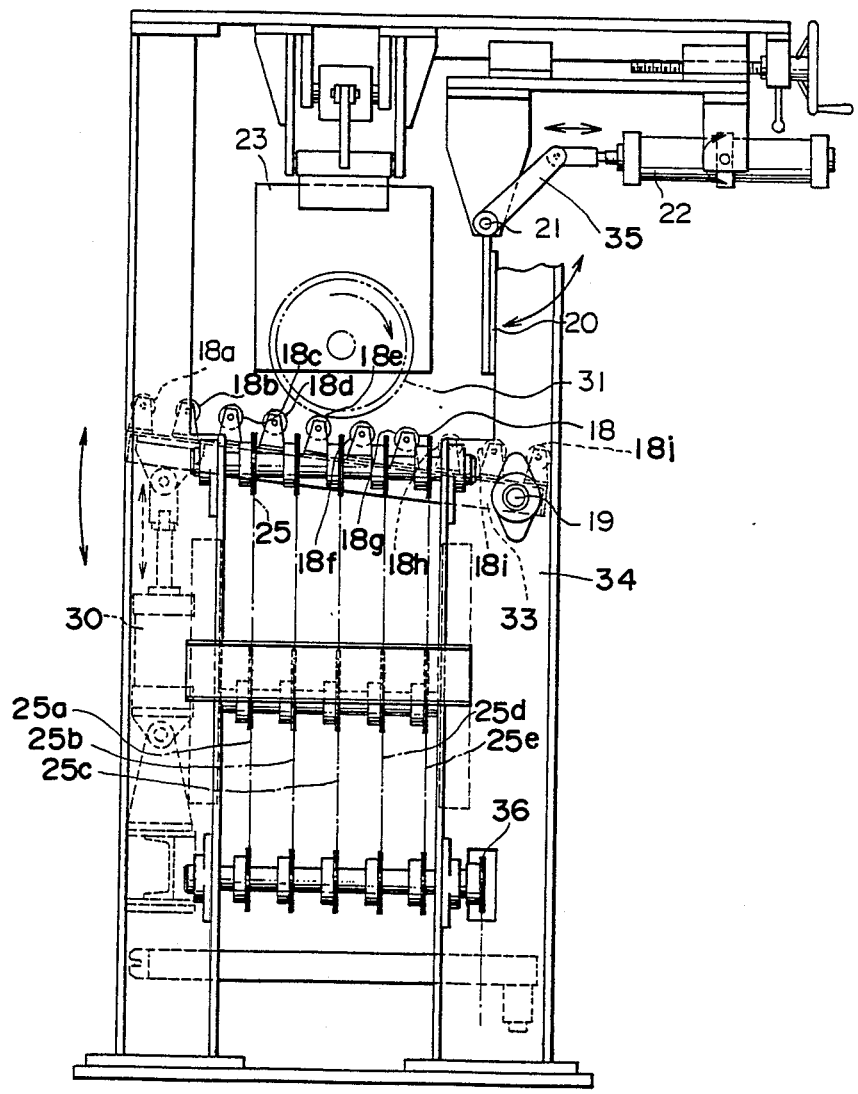
FIG. 2 is a side view of the delivering apparatus according to the embodiment of the present invention of FIG. 1.
Figure 3:
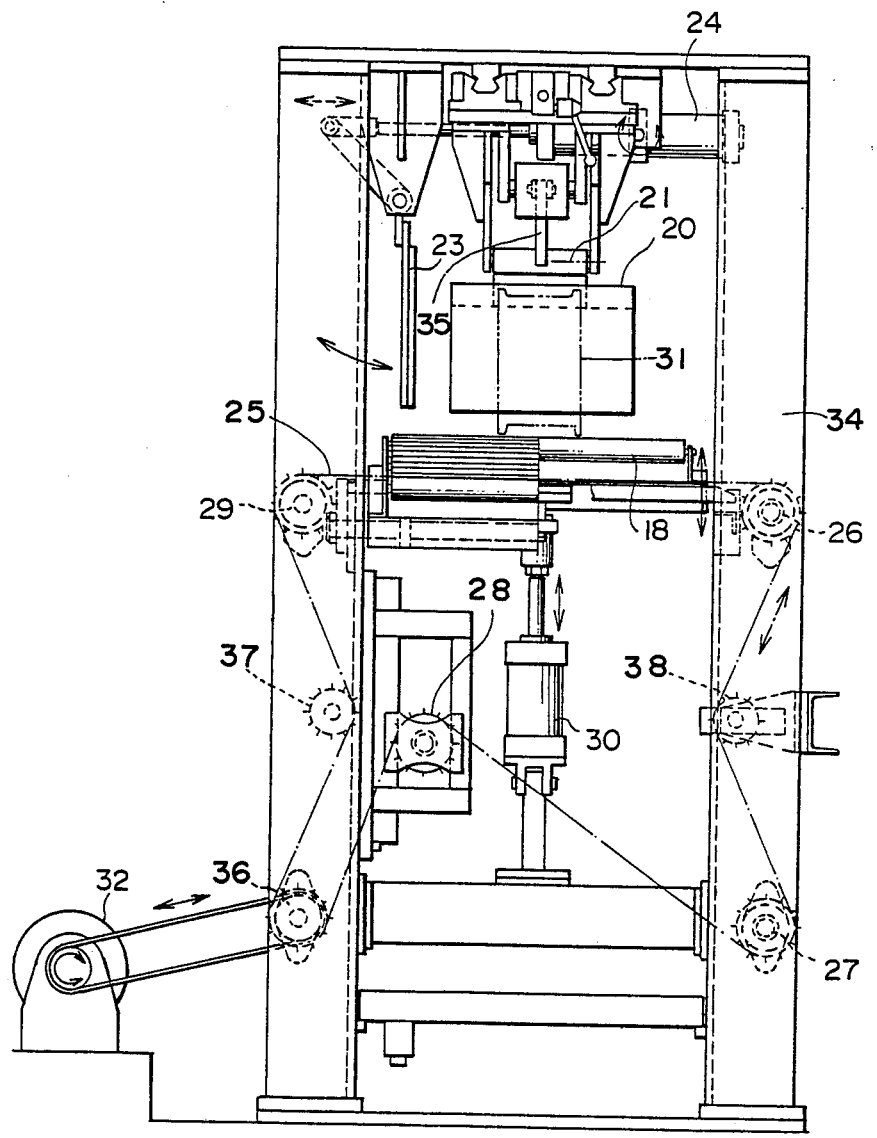
FIG. 3 is a front view of the delivering apparatus according to the embodiment of the present invention of FIG. 1.
Figure 4:
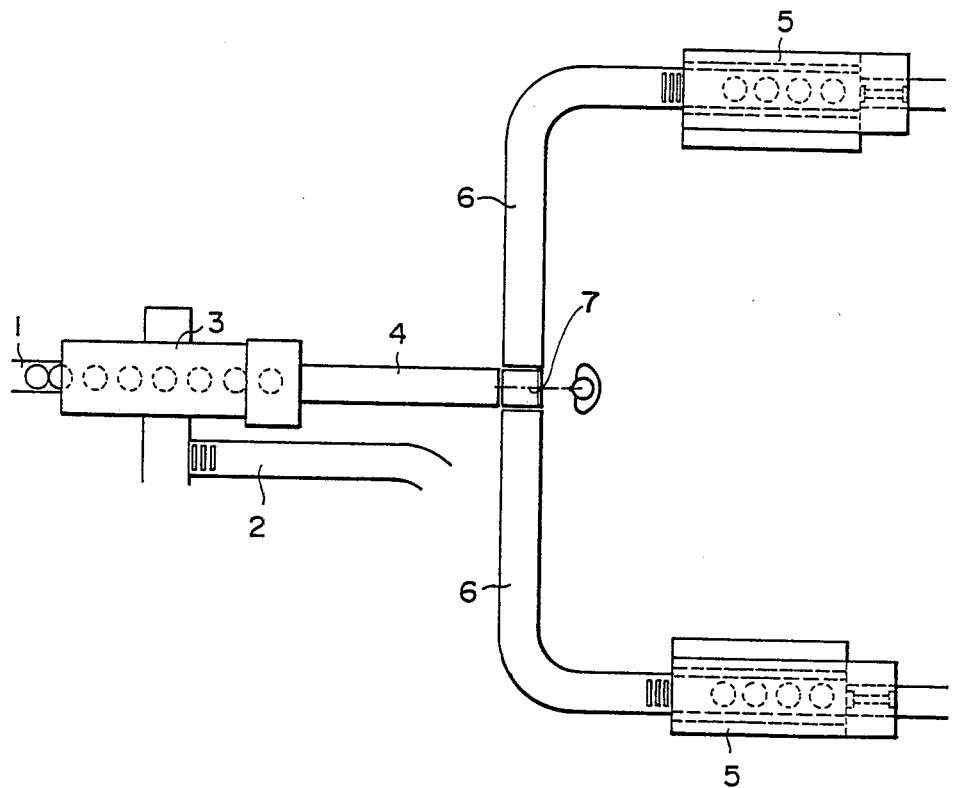
FIG. 4 is a schematic view of a portion of a conventional wheel production line.

FIGS. 2 and 3 illustrate in detail the delivering apparatus according to the present invention. The delivering apparatus comprises a series of free rollers 18, a first stopper 20, and a series of chains 25. The series of free rollers 18 enables work product 31 to flow frontward onto first exit path 12. The series of free rollers 18 comprises a plurality of free rollers 18a, 18b, ... and each free roller extends in a direction which is at a right angle with respect to the direction in which inlet path 11 and first exit path 12 extend. Since work 31 has a substantially cylindrical outer surface contour, it should be conveyed onto the series of free rollers 18 with the axis of work 31 maintained in parallel with axes of free rollers 18a, 18b, ..., so that it can be smoothly conveyed toward first exit path 12.

The series of free rollers 18 is selectively moved between an upper position (the position shown in FIGS. 2 and 3) and a lower position which is positioned lower than the upper position. Each roller 18a18b, ..., to be moved is supported by a bracket 33 so as to freely rotate around its axis. Bracket 33 extends in the direction in which inlet path 11 and first exit path 12 extend, and one end portion of bracket 33 nearer to first exit path 12 is pivotally supported by a framework 34 such that bracket 33 can rotate around a pivot center 19. The other end portion of bracket 33 is pivotally connected to an upper end portion of a rod of air cylinder 30 which extends in a substantially vertical direction, and a lowermost portion of air cylinder 30 is pivotally connected to framework 34. When air cylinder 30 is in its extension state, the series of free rollers 18 takes the upper position, while when the air cylinder 30 is in its compressed state, the series of free rollers 18 takes the lower position. When the series of free rollers 18 takes the upper position thereof, the series of free rollers 18 inclines obliquely downward in a direction away from inlet path 11, whereby work 31 can be helped to smoothly rotate or slip toward first exit path 12 by gravity.

First stopper 20 is provided between the series of free rollers 18 and first exit path 12 above an end portion of the series of free rollers 18 nearer to first exit path 12. First stopper 20 is moved between an opening position and a closing position thereof. More specifically, first stopper 20 is pivotally supported by framework 34 such that first stopper 20 can rotate around a pivot center 21. First stopper 20 is connected via a link 35 to an end portion of a rod portion of an air cylinder 22 which is pivotally supported by framework 34. When air cylinder 22 is extended, first stopper 20 opens and work 31 can move onto first exit path 12 without being interfered with by first stopper 20, whereas when air cylinder 22 is compressed, first stopper 20 is closed such that work 31 is prevented from moving onto first exit path 12.

The series of chains 25 is comprised of a plurality of chains 25a, 25b, ... disposed between two adjacent free rollers 18a, 18b, ..., such that movement of the series of free rollers 18 does not interfere with the series of chains 25. Each chain extends in the same direction as the direction in which each free roller 18a, 18b, ... extends and comprises an endless chain which is selectively driven in either a normal or reverse direction. An uppermost portion of the series of chains 25 extends horizontally between second exit path 13 and third stopper which is provided between intersection 15 and third exit path 14, and the uppermost portion of the series of chains 25 is vertically disposed between the upper position and the lower position between which the series of free rollers 18 is moved. Thus, when the series of free rollers 18 takes the upper position, the uppermost portion of the series of chains 25 is positioned lower than the series of free rollers 18 such that work 31 can contact only the series of free rollers 18. On the other hand, when the series of free rollers 18 takes the lower position, the uppermost portion of the series of chains 25 is positioned higher than the series of free rollers 18 such that work 31 contacts only the uppermost portion of the series of chains 25.

Each chain 25a, 25b, ... tooth-engages a plurality of sprockets 26, 27, 28, 29, 36, 37 and 38 as shown in FIG. 3. One sprocket 36 of the plurality of sprockets 26, 27, 28, 29, 36, 37 and 38 is connected to a motor 32 and is driven. Motor 32 comprises a reversible motor which can selectively rotate in either the normal or reverse direction. Thus, each chain is selectively driven in either the normal or reverse direction.

The delivering apparatus of the present invention may further comprise a second stopper 23 which is provided between intersection 15 and second exit path 13 and a third stopper which is provided between intersection 15 and third exit path 14. Second stopper 23 is selectively rotated between an opening position and a closing position by an air cylinder 24 in a manner similar to the opening/closing operation of first stopper 20. Since the third stopper has the same structure as that of second stopper 23, the third stopper is omitted from FIGS. 2 and 3 for purpose of simplifying the drawings for better understanding.

Air cylinder 30 for driving the series of free rollers 18 between the upper and lower positions, air cylinder 22 for opening/closing first stopper 20, the air cylinders for opening/closing the second and third stoppers, and motor 32 for driving the series of chains 25 in normal/reverse directions are electrically connected to a computer (not shown) and are controlled by the computer such that the below-mentioned operation is performed.

Next, operation of the above-described delivering apparatus of the present invention will be explained.

When work 31 is required to be conveyed forward, first stopper 20 is opened, and the series of free rollers 18 is moved to the upper position, which is positioned higher than the uppermost portion of the series of chains 25. Second stopper 23 and the third stopper are closed. In this condition, when work 31 is conveyed from inlet path 11 onto the series of free rollers 18, work 31 will rotate and/or slip forward due to free rotation of free rollers 18a, 18b, . . . , due to inertial forward movement and the force of gravity on work 31 according to the inclination of the series of free rollers 18 extending obliquely downward in the direction away from inlet path 11. In this manner, work 31 is selectively conveyed out onto first exit path 12 without being stopped by first stopper 20.

When work 31 is required to be selectively conveyed onto either second exit path 13 or third exit path 14, first stopper 20 is closed. Thus, work 31, which is being conveyed toward first exit path 12 on the series of free rollers 18, hits first stopper 20 and stops. Then, the series of free rollers 18 is moved downward to the lower position thereof, and work 31 is supported by the uppermost portion of the series of chains 25. Then, either the second stopper or the third stopper is selectively opened according to which exit path 13 or 14 work 31 is required to be conveyed out. Then, the series of chains 25 is selectively driven by motor 32 in the direction in which work 31 is required to be conveyed out. In this manner, work 31 is conveyed out onto the required exit path 13 or 14.

Work 31, which has been conveyed out onto one of three exit paths 12, 13 and 14, is next conveyed on the exit path to the corresponding welding station 17. The computer reads signals from the welding stations 17 and calculates to which welding station work 31 should be delivered taking into consideration the following: (a) which welding station is vacant or is going to be vacant and (b) the time at which work 31 is taken into the delivering apparatus. The delivering apparatus thus operates according to the output signals of the computer; however, the present invention relates to the structure and the mechanism of the delivering apparatus and is not specifically directed to the operation program of the computer, the specifics of such a operation program believed to be well within the skill of one of ordinary skill in the art.

Thus, according to the present invention, the following effects can be obtained:

First, delivering can be changed from a manual one to an automatic machine handling one, and as a result, increased safety in working conditions and increase in production efficiency are obtained.

Second, since there is no necessity for providing space for a worker opposite to inlet path 11, three exit paths, 12, 13 and 14 can be provided. This increases production efficiency without being restricted by production time of the welding station, which requires more time than the inserting station.

Third, since there are more exit paths than the two exit paths of a conventional delivering apparatus, even if any one of the welding stations malfunctions, a plurality of effective exit paths remain such that production efficiency is minimally affected. Furthermore, when a plurality of production lines are integrally provided as shown in FIG. 1, production efficiency is further enhanced because conveying from one line to another line is possible. Accordingly, maintenance of any one of the welding stations is possible without stopping all lines.

Although only one exemplary embodiment of the present invention has been described in detail above, those skilled in the art will readily appreciate that many modifications are possible in the exemplary embodiment without materially departing from the novel teachings and advantages of the present invention. Accordingly, all such modifications are intended to be included within the scope of the present invention as defined in the following claims.

What is claimed is:

1. A delivering apparatus, disposed on a disk wheel production line between an insertion station where a disk is inserted into a wheel rim and a plurality of welding stations where said wheel rim and said disk are welded to each other, for selectively delivering a work comprising a combination of said wheel rim and said disk inserted into said wheel rim to be conveyed from one inlet path connected to said insertion station to one of three exit paths connected to said welding stations, said exit paths comprising a first exit path which extends opposite to said inlet path from an intersection of said inlet path and said exit paths, a second exit path which extends to the right from said intersection and a third exit path which extends to the left from said intersection, said delivering apparatus being located at said intersection, said delivering apparatus comprising:

a series of free rollers for flowing said work from said inlet path to said first exit path, said series of free rollers being selectively movable between an upper position and a lower position positioned lower than said upper position, each free roller of said series of free rollers extending in a direction which is at a right angle with respect to the direction in which said inlet path and said first exit path extend;

a bracket for supporting said series of free rollers and a fixed framework for pivotally supporting said bracket, each roller of said series of free rollers being supported by said bracket so as to freely rotate around an axis of said each roller, said bracket having a first end portion nearer to said first exit path and a second end portion nearer to said inlet path, said first end portion of said bracket being pivotally connected to said framework and said second end portion of said bracket being supported so as to move substantially in a vertical direction such that when said series of free rollers take said upper position by upwardly moving said second end portion of said bracket to rotate said bracket around its pivot axis, said series of free rollers rotatably supported by said bracket incline obliquely downward in a direction away from said inlet path;

a first stopper provided between said series of free rollers and said first exit path, said first stopper being selectively moved between an opening position and a closing position; and a series of chains for selectively conveying said work to one of said second and third exit paths, each chain of said series of chains being disposed between adjacent free rollers of said series of free rollers and being selectively driven in either a normal or a reverse direction, an uppermost portion of said series of chains being disposed between said upper position and said lower position between which said series of free rollers is moved, said uppermost portion of said series of chains extending horizontally between said second exit path and said third exit path and being fixed in position in the vertical direction, said series of chains being operable independently of said second and third exit paths.

2. The delivering apparatus according to claim 1, wherein said other end portion of said bracket is pivotally connected to an upper end portion of a rod portion of said air cylinder and a cylinder portion of said air cylinder is pivotally connected to said framework.

3. The delivering apparatus according to claim 1, wherein each said chain composing said series of chains is wound around a plurality of sprockets, one of said plurality of sprockets being connected to a reversible motor which is selectively driven in one of normal and reverse rotational directions.

4. The delivery apparatus according to claim 1, wherein said first stopper is pivotally connected to a framework vertically above a surface on which the work is conveyed and is selectively rotated to open/close by a link to an air cylinder supported by said framework.

5. The delivering apparatus according to claim 1, further comprising a second stopper disposed between said intersection and said second exit path and a third stopper disposed between said intersection and said third exit path.

6. The delivering apparatus according to claim 1, wherein two of said delivering apparatuses are disposed so that said second exit path of a first delivering apparatus and said third exit path of a second delivering apparatus are used in common.

7. The delivering apparatus according to claim 5, wherein said second stopper and said third stopper are each pivotally connected to a framework vertically above a surface on which the work is conveyed and are selectively rotated to open/close by links to respective air cylinder supported by said framework.

* * * * *